United States Patent
Pisony (10) Patent No.: US 7,591,629 B2
(45) Date of Patent: Sep. 22, 2009

(54) ALL TERRAIN LUMBER COLLECTION AND STACKING APPARATUS

(76) Inventor: Murray Walter Pisony, P.O. Box 87, Lundbreck (CA) T0K 1H0

( * ) Notice: Subject to any disclaimer, the term of this patent is extended or adjusted under 35 U.S.C. 154(b) by 214 days.

(21) Appl. No.: 11/160,060

(22) Filed: Jun. 7, 2005

(65) Prior Publication Data

US 2006/0285956 A1    Dec. 21, 2006

(51) Int. Cl.
*B65G 57/02* (2006.01)
*B65B 43/24* (2006.01)
*B60P 1/00* (2006.01)
*B65B 57/10* (2006.01)
*B65G 67/24* (2006.01)

(52) U.S. Cl. ............. 414/792.9; 53/589; 414/501; 414/789.7; 414/523; 100/4

(58) Field of Classification Search ......... 414/501–507, 414/509, 731, 789.7, 789.5, 791.1, 792.9, 414/745.7, 745.9, 746.1, 746.4, 746.7, 746.8, 414/523; 53/531, 589; 144/4.1, 335; 100/4
See application file for complete search history.

(56) References Cited

U.S. PATENT DOCUMENTS

| | | | |
|---|---|---|---|
| 3,414,027 A * | 12/1968 | Larva, Sr. et al. ............. 83/94 |
| 3,631,995 A | 1/1972 | Jones et at |
| 3,730,367 A | 5/1973 | Heffington |
| 3,910,326 A | 10/1975 | Tucek |
| 3,933,389 A | 1/1976 | Korbel |
| 4,005,894 A | 2/1977 | Tucek |
| 4,023,848 A | 5/1977 | Bennett |
| 4,127,070 A * | 11/1978 | Dieringer et al. ............... 104/9 |
| 4,947,904 A | 8/1990 | Dika |
| 5,697,753 A * | 12/1997 | Aurora et al. ............... 414/398 |
| 5,934,861 A | 8/1999 | McLeod |
| 6,363,980 B1 | 4/2002 | Kurelek |
| 6,401,368 B1 | 6/2002 | McLeod |
| 6,779,570 B2 | 8/2004 | Tardif |
| 2004/0084111 A1 | 5/2004 | Tardif |
| 2005/0132667 A1 | 6/2005 | McLeod |

FOREIGN PATENT DOCUMENTS

| | | |
|---|---|---|
| CA | 2241682 | 2/1999 |
| CA | 2315046 | 2/2002 |
| CA | 2360868 | 7/2002 |

* cited by examiner

*Primary Examiner*—Gregory W Adams
(74) *Attorney, Agent, or Firm*—Bennett Jones LLP (57) ABSTRACT

An apparatus for picking up, stacking and bundling lumber, that comprises: a drive means, a conveyor assembly having a receiving bin and a conveyor, a stacking assembly operatively connected to the conveyor assembly, and having an unscrambling hopper, a row conveyor, a stacking bin and a bundling assembly a discharge platform, and a grapple assembly that picks up lumber pieces from the ground and deposits them into the receiving bin, and that also picks up bundles of lumber produced by the stacking assembly, for movement to a secondary location. The apparatus can be used on a variety of different terrains, including inclines and declines and can pick up lumber from a wide radius around the apparatus and from a number of ground conditions including rocky, muddy and wet ground.

13 Claims, 9 Drawing Sheets

ALL TERRAIN LUMBER COLLECTION AND STACKING APPARATUS

FIELD

The present invention relates to an all terrain apparatus for collecting and stacking lumber pieces.

BACKGROUND

In laying pipe, such as in gas or oil pipeline, it s conventional that lengths of pipe are supported end to end on stacked lumber pieces known as "skids" so that the pipe lengths can be held at a required height to be supported and aligned end to end for welding of the lengths, prior to feeding of the completed welded length into a trench adjacent to the stacks. After the pipe lengths are welded into a continuous length, the pipe is lifted from the skids and deposited in a continuous action along its length into the trench.

At some point, usually after the pipe has been laid into the trench, it is necessary to collect the lumber pieces from the skids and to transport them to a new site, preferably to be used again, for example at a further location along the pipeline.

The lumber pieces, which are conventionally either four or five feet in length and six by four inches in cross section are lifted and handled manually for stacking onto a transport container. This manual process is expensive and time consuming, since it requires a gang of laborers working hard and commanding high wages. In many cases the stack has been disturbed, and the pieces are strewn about, or even compressed in the ground by the tracks of passing vehicles, making the work even more labor intensive.

While this step is a relatively minor one in the process of laying the pipeline, it constitutes a significant expense and therefore provides a significant opportunity for a manufacturer of an effective machine which will carry out this step while eliminating or reducing the manual labor involved.

In U.S. Pat. No. 5,934,861 issued Aug. 10, 1999, which corresponds to Canadian patent application no. 2,241,682 published February 1999, discloses an apparatus for picking up pieces of lumber and conveying them to a transport truck. Canadian patent application no. 2,315,046 published Feb. 3, 2002 discloses an apparatus for picking up, stacking and bundling pieces of lumber.

Both of these prior art apparatuses are limited in application, in that they require smooth, flat and dry ground conditions in order to pick up lumber pieces from the ground. Further, they cannot pick up lumber pieces from a ground surface that is more than 30 cm above or below the tractor that is powering the apparatus. They are also limited in that the area in which lumber can be picked up is restricted to the width of the opening of the pick up section of the apparatus.

SUMMARY

The present apparatus uses a grapple to pick up and deposit lumber pieces from the ground into a conveyor assembly, which cleans and orients the lumber for deposition into a stacking and bundling assembly. The bundled lumber that is prepared by the stacking and bundling assembly can be deposited to the ground, or it can be stored in a storage area on the apparatus itself, where it may be carried to a secondary location for transfer to another vehicle. The grapple may be used to move the bundles of lumber that are prepared by the stacking and bundling assembly, either to the ground or to the storage area on the apparatus.

One advantage of the apparatus described herein, as compared to prior art apparatus disclosed in Canadian patent application no. 2,315,046, is that it does not have to be moving in a forward direction, in order to pick up lumber pieces from the ground. Therefore it may be used for stationary yard work. Another advantage is that the apparatus can pick up and bundle lumber from many different types of uneven ground surfaces (e.g., muddy, rocky, wet), or from water. Another advantage is that it may pick up lumber over a wide area surrounding the apparatus, for example in front of or on both sides of the apparatus, or on either side of the pipeline or the trench in which the pipeline has been laid. In one embodiment the apparatus comprises leveling means, so that it is able to function on inclines and declines. In one embodiment the apparatus can store bundled lumber for transport to a secondary location, avoiding the need to have a second vehicle pick up and transport the bundled lumber produced by the apparatus.

In one aspect, the invention is an apparatus for picking up, stacking and bundling lumber, comprising:
  (a) a drive means,
  (b) a conveyor assembly that comprises a receiving bin and a conveyor,
  (c) a stacking assembly operatively connected to the conveyor assembly, and that comprises an unscrambling hopper, a row conveyor, a stacking bin and a bundling assembly,
  (d) a discharge platform, and
  (e) a grapple assembly sized to pick up lumber pieces and deposit the lumber pieces into the receiving bin.

In one embodiment, the grapple assembly is further sized to pick up a bundle of lumber produced by the stacking assembly, for movement to a secondary location. In another embodiment, the drive means is a vehicle and the grapple assembly is mounted to the vehicle. In another embodiment the conveyor assembly, stacking assembly and discharge platform are on a trailer that is pulled by the vehicle. In another embodiment the grapple assembly is mounted to the trailer. In another embodiment, the apparatus further comprises a storage area. In yet another embodiment, the apparatus further comprises a means of raising and lowering the conveyor assembly.

In another aspect, the invention is a method of picking up, stacking and bundling lumber, comprising:
  (a) providing an apparatus that comprises:
    (i) a conveyor assembly that comprises a receiving bin and a conveyor;
    (ii) a stacking assembly operatively connected to the conveyor assembly, and that comprises an unscrambling hopper, a row conveyor, a stacking bin and a bundling assembly;
    (iii) a discharge platform, and
    (vi) a grapple assembly,
  (b) picking up loose lumber with the grapple and depositing it into the receiving bin, and
  (c) conveying the loose lumber along the conveyor to the stacking assembly, where the lumber is stacked and bundled into a bundle of lumber and deposited onto the discharge platform.

The method may further comprise the step of picking up the bundle of lumber from the discharge platform with the grapple and transferring it to a secondary location, such as a storage area provided on the apparatus.

In yet another aspect, the invention is an apparatus for picking up, stacking and bundling lumber, comprising:
  (a) a drive vehicle comprising a grapple assembly,
  (b) a trailer pulled by the drive vehicle that comprises:

(i) a conveyor assembly further comprising a receiving bin and a conveyor, (ii) a stacking assembly operatively connected to the conveyor assembly, further comprising an unscrambling hopper, a row conveyor, a stacking bin and a bundling assembly, and (iii) a discharge platform, wherein the grapple assembly comprises a grapple that is sized to pick up lumber and a bundle of lumber, and wherein the grapple assembly is sized to pick up lumber from a ground surface, to deposit said lumber into the receiving bin, and to pick up a bundle of lumber deposited onto the discharge platform.

The apparatus may further comprise a storage area on the trailer, and the grapple assembly may further be sized to pick up a bundle of lumber from the discharge platform and deposit the bundle of lumber in the storage area. The apparatus may further comprise a mast assembly for raising and lowering the conveyor assembly.

The apparatus may further comprise a means for adjusting the length of the unscrambling hopper or the stacking bin. The apparatus may further comprise a means for adjusting the width of the stacking bin.

BRIEF DESCRIPTION OF THE DRAWINGS

FIG. 9 A-E is side perspective views of one embodiment of the stacking bin, bundling assembly and discharge platform. FIGS. 9A-D demonstrates the process of moving the stack through the bundling assembly to the discharge platform. FIG. 9E shows various features of the stacking bin.

FIG. 10 A-C is side elevation views of an embodiment of the apparatus of this invention traveling up a hill with a 27 degree incline (A), on relatively level ground (B) and down a hill with a 27 degree decline.

DETAILED DESCRIPTION OF PREFERRED EMBODIMENTS

Reference will now be made to FIGS. 1-13, which show exemplary embodiments of the apparatus of the invention.

Figure 1:
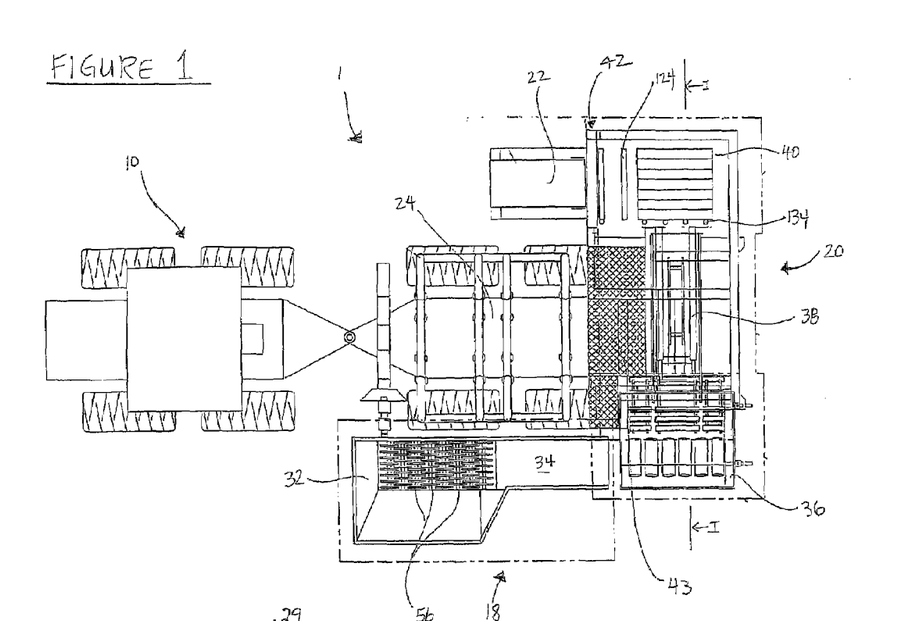
FIG. 1 is a top plan view of one embodiment of the apparatus of the invention.
Figure 2:
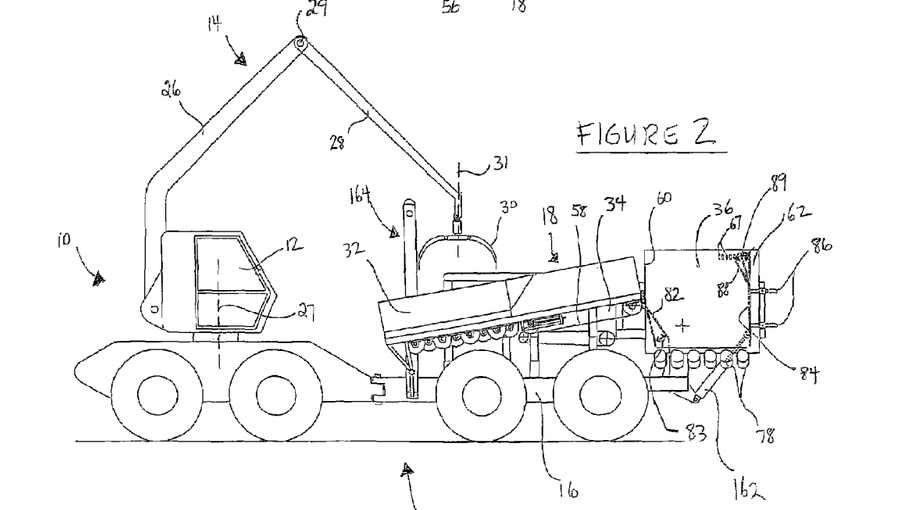
FIG. 2 is a side elevation view of one embodiment of the apparatus of the invention.

The apparatus 1, as shown in FIGS. 1 and 2, comprises a drive means 10, a grapple assembly generally indicated at 14, a conveyor assembly generally indicated at 18, a stacking assembly generally indicated at 20, a discharge platform 22 and optionally, a storage area 24. The grapple assembly 14 comprises a working arm 26, a grapple 30, and an optional extension arm 28. The conveyor assembly 18 comprises a receiving bin 32 and a conveyor 34. The stacking assembly 20 comprises an unscrambling hopper 36, a row conveyor 38, a stacking bin 40 and a bundling assembly 42.

The apparatus is moved by drive means 10, such as a vehicle (i.e., excavator), which may be operated by a driver who may sit in a cab 12. The driver may also operate grapple assembly 14 and conveyor assembly 18. The apparatus is used to pick up, stack and bundle, lumber or timber. In one embodiment the lumber has been used to make skids for supporting a pipeline, but other types of lumber, such as that used in railway operations, could be picked up by this apparatus. A rear operator standing near the stacking assembly generally at position 43, controls the stacking operation and various other aspects of the stacking and bundling process, as will be described in more detail below.

In one embodiment, shown in FIGS. 1 and 2, conveyor assembly 18, stacking assembly 20, discharge platform 22 and storage area 24 may be mounted to a trailer or frame 16 that may be attached to and pulled by drive means 10. In another embodiment, drive means 10, conveyor assembly 18, stacking assembly 20, discharge platform 22 and optional storage area 24 may be of unitary construction (i.e., the drive means may not be a separate entity from the remainder of the apparatus).

The grapple assembly 14 comprises working arm 26 and grapple 30, and optionally an extension arm 28, the movement of which may be controlled by hydraulic cylinders, as is known in the art. Working arm 26 may be pivotally mounted to drive means 10 in such a manner that it may be capable of rotating vertically through a range of 360 degrees. In an alternative embodiment, working arm 26 may be mounted to trailer 16 in such a manner that it may be capable of rotating vertically through a range of 360 degrees. The driver is able to view grapple 30 in all of its orientations, in order to control the picking up of lumber pieces 44.

In one embodiment, shown in FIG. 2, working arm 26 may be mounted onto cab 12, which may be pivotally mounted to drive means 10. Cab 12 and therefore working arm 26, may rotate vertically around axis 27 through a range of 360 degrees rotation. Extension arm 28 may be pivotally mounted and extend between working arm 26 and grapple 30. Grapple 30 may be capable of rotating vertically around axis 31 through a range of 360 degrees and therefore may be rotated fully to pick up lumber pieces 44, regardless of the orientation of the lumber on the ground. In another embodiment, grapple 30 may be attached to working arm 26 at end 29, and may be able to rotate vertically through a range of 360 degrees.

Figure 3:
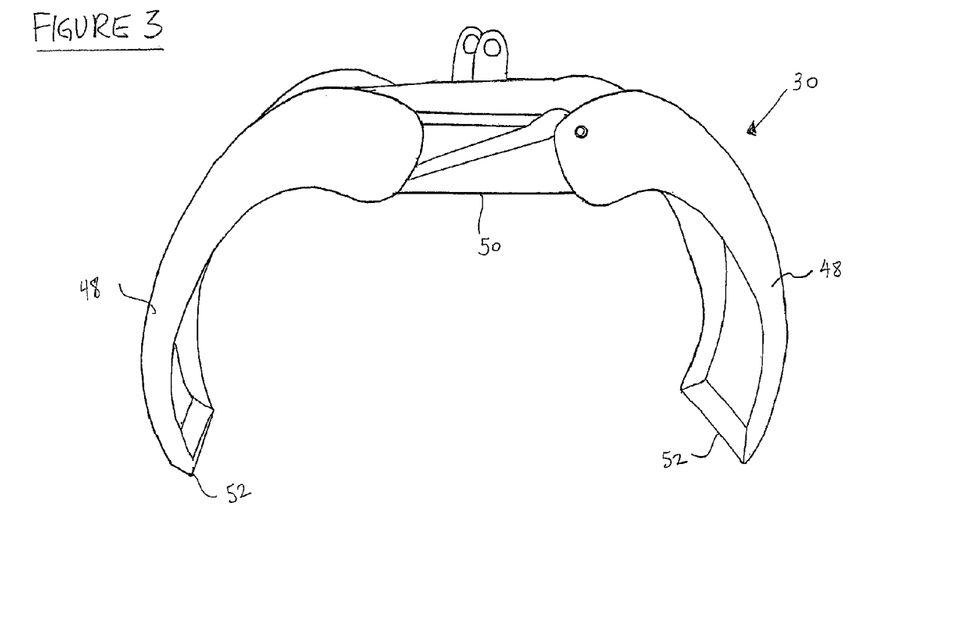
FIG. 3 is a side perspective view of one embodiment of the grapple.
Figure 4:
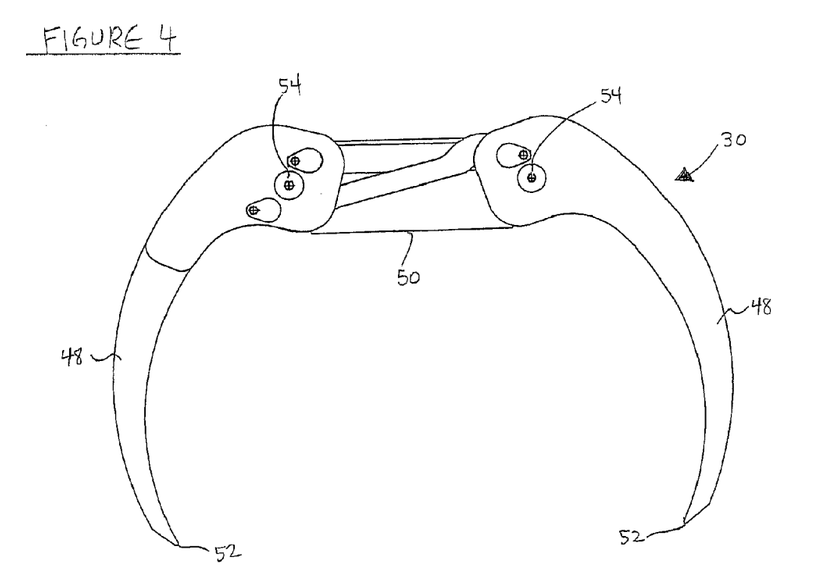
FIG. 4 is a side elevation view of one embodiment of the grapple.
Figure 5:
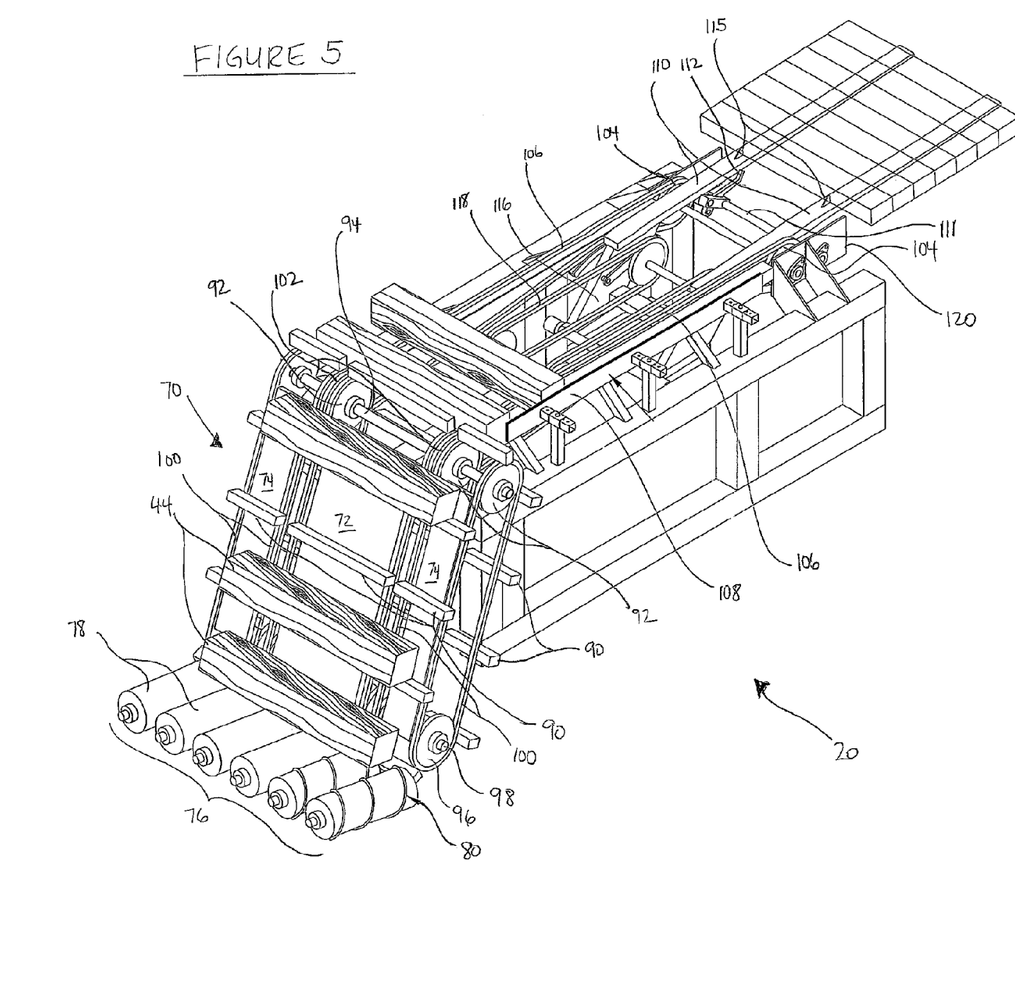
FIG. 5 is a side perspective view of one embodiment of the elevating chain assembly and row conveyor.

Grapple 30 may be used to grasp one, two or several pieces of lumber 44. As shown in FIGS. 3 and 4, grapple 30 has two grapple arms 48, each of which may be curved. The curvature causes loose lumber pieces to slide down into the grasp of the grapple as the grapple is being closed, to be carried therein.

The grapple arms may also pivot upwards towards top section 50, to hold the lumber pieces between the arms 48, or between the top section 50 and grapple arms 48.

Grapple 30 may also be used to pick up a bundle 46 of lumber, which may in some embodiments be rectangular (e.g., square) in cross section. To this end, the curvature of each of the grapple arms 48 may taper gently from the tip 52 to pivot point 54, where there may then be a sharp turn towards top section 50. Top section 50 may be sized to accommodate the full width of a side of the bundle of lumber that is to be picked up, and may be relatively flat. This enables top section 50 of grapple 30 to engage the full side of the bundle 46 of lumber. The grapple arms 48 may then close around the bundle to squeeze the bundle from the bottom and push it up against top section 50. By gripping the bundle 46 in this way, the corner edges of the bundle and the sides of the bundle may not be distorted, and the shape of the bundle of lumber may be maintained. Grapple 30 may be opened and closed using a hydraulic cylinder assembly, as is known in the art.

The conveyor assembly 18 receives the lumber pieces from the grapple and transports the pieces to unscrambling hopper 36. The conveyor assembly comprises receiving bin 32 to receive the lumber pieces that are deposited therein by grapple 30 and conveyor 34, which transports the lumber pieces to unscrambling hopper 36, as best seen in FIG. 1. In one embodiment, receiving bin 32 may comprise a series of rollers 56 along its bottom. These rollers may each comprise a shaft and a plurality of disks—i.e., they may be "knobbed". Knobbed rollers 56 remove and filter mud and other debris from the lumber pieces. Conveyor 34 conveys lumber pieces from receiving bin 32 to unscrambling hopper 36. Conveyor 34 may also function to orient the lumber pieces, because it may be narrower in width than the length of the lumber pieces being conveyed, and therefore the lumber pieces would generally be oriented longitudinal of the conveyor 34 before deposition into unscrambling hopper 36. In one embodiment conveyor 34 may comprise a conveyor belt 58 mounted on a plurality of rollers (not shown) so that an upper run of the belt carries the lumber pieces towards unscrambling hopper 36. In another embodiment conveyor 34 may comprise a series of rollers, in addition to the rollers 56 along the bottom of bin 32, that transport lumber pieces from bin 32 into hopper 36. In yet another embodiment, these additional rollers may be knobbed, for further cleaning of the lumber pieces. Conveyor 34 may be a part of, or integral to, bin 32.

The lumber pieces are discharged from conveyor 34 into unscrambling hopper 36, which is the first component of stacking assembly 20. Stacking assembly 20 functions to assemble the loose lumber pieces into a stack of predetermined shape and size, and to bundle the pieces of that stack securely together. Stacking assembly 20 need not be mounted in a subframe.

Unscrambling hopper 36 functions to receive the scrambled lumber pieces from conveyor 34, and to orient them all into the same direction, for formation of the stack. Unscrambling hopper 36 comprises a front wall 60, a back wall 62 and two side walls 64 and 66 that form at their base an apex 68 longitudinal of unscrambling hopper 36 and thus longitudinal of conveyor 34. Side wall 64 may be inclined and may comprise an elevating chain assembly 70 that may be made of three parts, a center chain 72 and two side chains 74.

At apex 68 may be a roller assembly 76 comprising a plurality of unscrambling rollers 78 that may be spaced apart to permit debris to fall therebetween onto the ground surface. Unscrambling rollers 78 may be oriented at approximately right angles to the direction from which the lumber is received (i.e., approximately parallel to the front and back walls 60 and 62), and they may be sloped so that the ends closest to side wall 64 may be lower than the ends closest to side wall 66. Rollers 78 rotate in unison and in the same direction, which rotation may be controlled by the rear operator, using a variable hydraulic valve. In a preferred embodiment, rollers 78 rotate in a direction that causes the lumber pieces to be moved towards back wall 62. The rotation and sloping of the unscrambling rollers 78 displaces lumber pieces 44 towards elevating chain assembly 70, and in a preferred embodiment towards back wall 62. Spiral flighting 80 on one or more of the unscrambling rollers 78 may also be used, to facilitate the movement of lumber pieces 44 towards elevating chain assembly 70.

Figure 8:
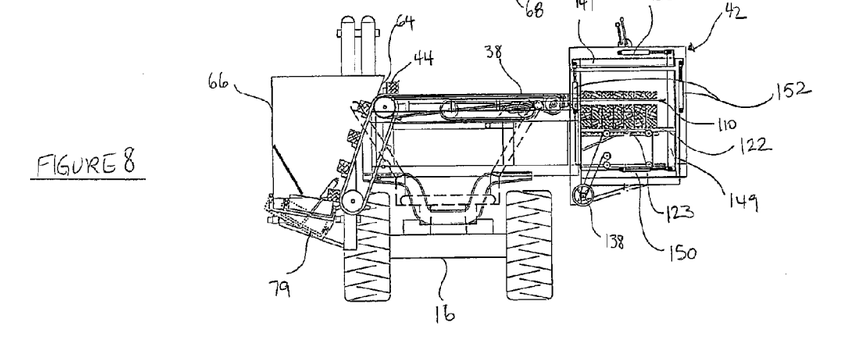
FIG. 8 is a sectional view taken along line I-I of the apparatus shown in FIG. 1.

The roller assembly 76 may be lowered by the driver or rear operator, for example by unlatching the assembly and activating one or more hydraulic cylinders, to lower the roller assembly. FIG. 8 shows the roller assembly 76 at lowered position 79 (which is a partially opened position). This will permit, for example, the removal of large rocks or debris from unscrambling hopper 36.

Front wall 60 may further comprise an additional panel 82 that enables the driver or rear operator to make adjustments to vary the length of the apex 68, as shown in FIG. 2. The top edge of panel 82 may be attached to front wall 60, for example to a slotted track, to permit the top edge to slide vertically when the bottom edge of panel 82 is moved towards and away from back wall 62. Arrow 83 in FIG. 2 shows how the bottom edge of panel 82 may be moved towards and away from front wall 60. At the bottom edge of panel 82, tubular supports may be used to secure the bottom edge in a selected position. This panel feature facilitates the use of unscrambling hopper 36 with lumber pieces of varying lengths—for example 4 feet or 5 feet in length.

Disposed inside back wall 62 may be an adjustable panel 84 that may be moved towards and away from front wall 60, as seen in FIG. 2. The position of panel 84 may be determined by adjustment, in increments, of telescoping tubular supports 86 mounted to stationary back wall 62. This permits the driver or rear operator to adjust the length of apex 68 or hopper 36, to facilitate use with lumber pieces of varying lengths—for example 4 feet or 5 feet in length.

Supports 86 may be independently adjustable. Therefore, panel 84 may be adjusted to tilt from top to bottom, so that the top edge of the panel may be closer to front wall 60 than the bottom edge of the panel. By tilting panel 84 in this way the lumber pieces, as they are raised upwards by elevating chain assembly 70, may be forced flush at one end for bundling. When combined with a preferred embodiment, mentioned above, in which rollers 78 rotate in a direction that causes the lumber pieces to be moved towards back wall 62, this feature eliminates the need for an end alignment belt to align the lumber pieces in the stack.

Panel 84 may also be adjusted to tilt from side to side, so that one side edge may be closer to front wall 60 than the other side edge, more specifically, so that the edge running along side wall 64 may be further from front wall 60 than the edge running along side wall 66. By tilting panel 84 in this way, lumber pieces 44 may move with less friction towards elevating chain assembly 70, located on side wall 64.

The top portion of adjustable panel 84, or of back wall 62, may comprise an additional plate 88 that may be attached to panel 84 or to back wall 62, at the bottom edge, for example with a hinge or by a slotted track. Thus, the top edge of plate 88 may be moved toward and away from back wall 62. The top edge of plate 88 may be secured by a horizontal sliding and locking pin assembly that inserts into spaced vertical slots 67 on wall 66. Arrow 89 in FIG. 2 shows how the top edge of plate 88 may be moved towards and away from back wall 86. When plate 88 is in a lowered position, as shown in FIG. 2, the alignment of lumber pieces onto elevating chain assembly 70 may be assisted by causing a piece of lumber that may be vertically oriented at the back wall 62, when it contacts plate 88, to be forced to fall back into the unscrambling hopper 36 in a horizontal orientation.

Elevating chain assembly 70 comprises, in this embodiment, center chain 72 and two side chains 74, one on either side of the center chain 72. A plurality of substantially horizontal abutment bars 90 project outwardly, in order to engage lumber pieces 44. The elevating chain assembly and abutment bars preferably extend across the entire width of side wall 64 rather than only part of side wall 64 as known in the prior art, and therefore debris build up in the bottom of unscrambling hopper 36 may be avoided. The abutment bars also facilitate unscrambling of lumber pieces as they are received in unscrambling hopper 36, as lumber pieces that become positioned vertically in the unscrambling bin may be dislodged by the abutment bars. As is apparent, elevating chain assembly 70 may also be made of one or two elevating chains, or more than three elevating chains. The same advantages (i.e., avoiding build up of debris and dislodging lumber pieces) can be achieved using any assembly of elevating chains wherein the abutment bars extend substantially from side to side of wall 64.

Elevating chain assembly drive sprockets 92 may be mounted on an upper shaft 94 and idler sprockets 96 may be mounted on shaft 98, with chains 100 carried thereon. As shafts 94 and 98 rotate, lumber pieces in unscrambling hopper 36 are engaged by abutment bars 90, lifted upwards along inclined side wall 64 over the top edge of the side wall and deposited onto row conveyor 38.

Row conveyor 38 functions to assemble a row of lumber pieces 44 and to transfer that row into stacking bin 40, to form a stack of lumber pieces. Row conveyor 38 may comprise idler sprockets 102, drive sprockets 104 and chains 106. Idler sprockets 102 may be mounted on upper shaft 94. The use of upper shaft 94 with both elevating chain assembly drive sprockets 92 and idler sprockets 102 provides for a smooth transition of lumber pieces 44 from the elevating chain assembly 70 to the row conveyor 38. The lumber pieces may be deposited onto chains 106, and may be moved on chains 106 towards stacking bin 40. Row conveyor 38 may additionally comprise an adjustable alignment fence 108, to help ensure that the ends of the lumber pieces are flush with one another for bundling.

Lumber pieces 44 are fed up the elevating chain assembly 70 generally side by side onto conveyor chains 106. If more than one lumber piece is carried on any particular abutment bar 90, the pieces may end up on top of one another on the row conveyor and this problem may be overcome manually by the rear operator standing on the apparatus near the row conveyor 38, generally at area 43, to ensure that the stacking process proceeds effectively.

Figures 6, 7:
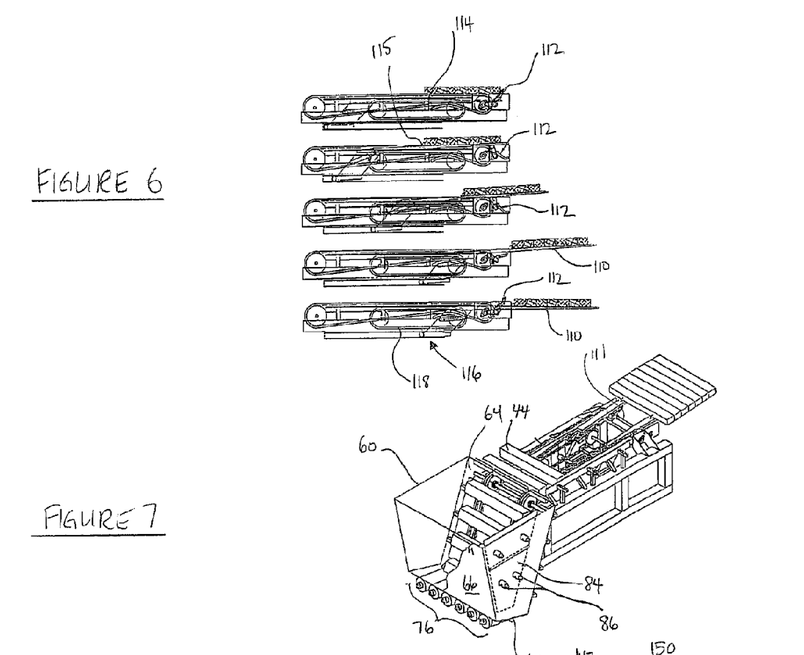
FIG. 6 is a side elevation view of one embodiment of the row conveyor.
FIG. 7 is a side perspective view of one embodiment of the unscrambling hopper and row conveyor.

Lumber pieces 44 may be fed along row conveyor 38 over top of a pair of lifting arms 110, which may normally be positioned below the level of chains 106 (in "home position"), so that lumber pieces 44 will clear rear dog 115 as they move on the row conveyor. The lumber pieces progress towards stacking bin 40 until they abut stops 112, which halt the forward movement of the lumber pieces. The pieces that follow back up against the previously stopped pieces to form a row of lumber pieces arranged side-by-side and extending back towards unscrambling hopper 36. When a lumber piece is positioned and stopped overtop of sensor 114, the approximate location of which is shown in FIG. 6, lifting arms 110 may be lifted up by an actuating mechanism 111, activated for example by a hydraulic cylinder, that simultaneously lowers stops 112. The lifting arms 110 lift up the row of lumber and rear dog 115 on each of the arms engages the rearmost lumber piece of the accumulated row. The row is carried forward on a carriage system 116 driven by chains 118, to bundle elevator in stacking bin 40, which may comprise horizontal spaced supports 122 mounted onto a carriage 123, that may be an independent roller assembly that moves vertically in a track (not shown). When lifting arms 110 are extended over the horizontal spaced supports, actuating mechanism 111 retracts, thus lowering arms 110 to home position and simultaneously raising stops 112. The lumber pieces abut end 120 (FIG. 5), as the lifting arms 110 being to retract towards hopper 36, and may thus be deposited onto supports 122.

The bundle elevator may already have one or more rows of lumber loaded thereon, and/or the rear operator may have manually adjusted a tier of lumber in order to later assist with the handling and transfer of bundle 46, for example with a forklift. FIG. 9A-D shows a stack of lumber in which lumber in the second from bottom tier has been reoriented manually to facilitate future movement and storage of bundle 46. The stacking of additional rows of lumber continues until horizontal spaced supports 122 are lowered to a point where they are below stacking rollers 124, thus leaving the stack of lumber sitting on the stacking rollers 124 at the bottom of the stacking bin 40. The rollers 124 may then be driven by a chain 125, connected across chain wheels 119, so as to forward the stack into bundling assembly 42.

Stacking bin 40 assembles the rows of lumber pieces into a stack and transmits that stack to bundling assembly 42. The stacking bin has a front 126, a back 128 and sides 130 and 132. Rollers 134 extend vertically on the front of the stacking bin. In one embodiment, rollers 134 extend from the ends of rollers 124 and may be driven by a gear assembly from the end of rollers 124. These rollers reduce the probability that the stack of lumber pieces will snag the stacking bin 40, as the bundle moves horizontally into bundling assembly 42.

Several other features of stacking bin 40 represent improvements over the stacking bin disclosed in CA patent application no. 2,315,046. Back 128 may comprise a plate 127 that may be adjustable to move substantially horizontally towards and away from front 126, to accommodate lumber of varying widths. For example, a standard width of lumber is six inches, however this width may be more or less than six inches. If plate 127 does not fit snugly up against the lumber stack, the outer lumber pieces 44 may fall into the gap between the wall and the stack, and therefore distort the shape of the stack before it moves horizontally into bundling assembly 42. The position of plate 127 may be determined by adjustment, in increments, for example by a threaded rod inside tubular supports 129 mounted to the frame of stacking bin 40.

Plate 127 may also be hinged at the bottom to allow the wall to fold inwards and downwards, which may be accomplished, for example, with hydraulic cylinders. This feature may be used during transport of the apparatus, as the stacking bin and bundling assembly may be rotated 180 degrees for transport, to rest over top of row conveyor 38.

Side 130 may comprise a plate 136 that may be adjustable to move towards and away from side 130, in order that the stacking bin 40 may accommodate lumber pieces of varying length, such as 4 feet or 5 feet. In one embodiment plate 136 may be adjusted by six inches. Adjustment of plate 136 may be accomplished by a wheel and pulley mechanism 138, as shown in FIG. 9.

Bundling assembly 42 comprises a substantially rectangular frame 140 sized to receive the stack of lumber therein, even in the event that the stack may be slightly loose or expanded in dimension by distorted or slightly twisted pieces. The bottom rail 142 of frame 140 may comprise a horizontal drive roller 144 disposed in the frame, to reduce the probability that the bottom row of lumber in the stack will become snagged by bottom rail 142 as it is advanced through the opening in the frame, and thereby hinder bundling of the stack.

Figure 9:
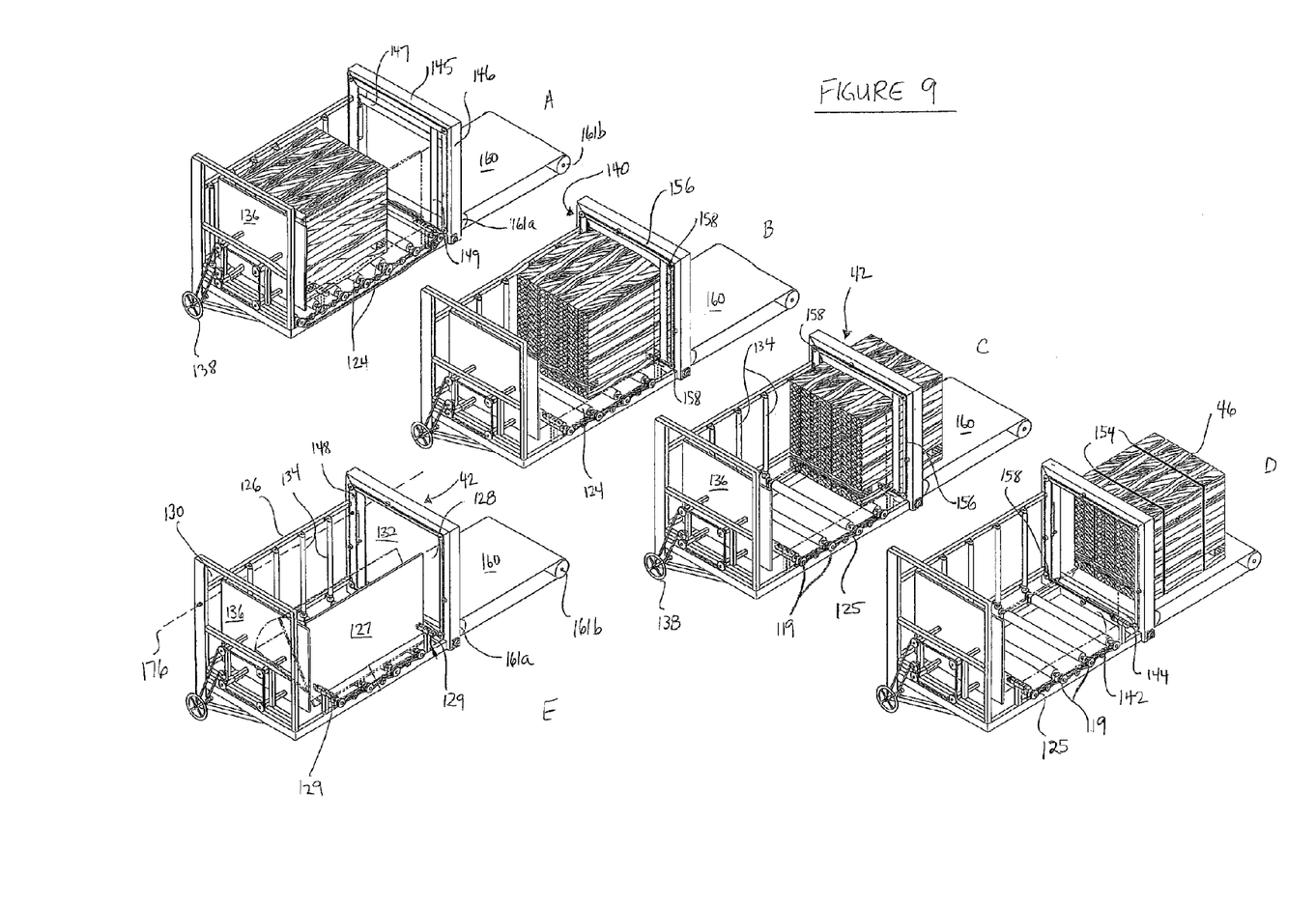

Bundling of the stack occurs essentially as described in CA patent application no. 2,315,046, which is incorporated by reference herein, and which is best shown in FIGS. 8 and 9. In addition to bottom rail 142, frame 140 comprises a top rail 145 and two side rails 146 and 148. A first clamping arm 147 may be disposed substantially parallel to a first rail, preferably retracted into a slot of the rail. The first clamping arm is preferably retracted into top rail 145. A second clamping arm 149 may be disposed substantially parallel to another rail that is substantially perpendicular to the first rail, preferably retracted into a slot in the rail. The second clamping arm is preferably retracted into side rail 146. Each of these clamping arms may be actuated with a pair of hydraulic cylinders 150 or 152 (see FIG. 8), into engagement with a surface of the stack of lumber, to thereby squeeze the lumber pieces within the stack so that they may be pressed together to eliminate spaces between the pieces and the ensure that they are fully aligned and in contact.

With the stack thus clamped, a length of strapping material 154 may be used to hold the lumber pieces in the stack securely together. Strapping material 154 may be carried around the stack by a chain 156, which extends around four sprockets 158 each mounted at a corner of frame 140. One of the sprockets may be driven and the others may be idlers, so that the chain can be rotated around the frame so as to complete a single loop around the frame. The chain 156 and sprockets 158 may be mounted on either the front or rear face of frame 140, so that they are alongside the frame and do not interfere with the movement of the stack through the frame 140. The chain carries, at one end, a gripping member (not shown) around which an end of strapping material 154 can be engaged so that the end may be carried with the chain as it moves around the frame, thus carrying the end completely around the stack to a position where it may be crimped manually with another end of the strapping material. The two ends of the loop of strapping material 154 may be crimped by a manually operable strapping system known in the art. For example, a crimping head that acts to tighten the loop and simultaneously crimp or lock the two ends of the loop together so the strapping is maintained fixed around the stack, may be used.

Clamping arms may then be released and the bundle 46 may then be advanced by stacking rollers 124 and/or discharge platform 22, and positioned to apply one more strap thereabout. When the desired number of straps is applied, the stacking rollers 124 and/or discharge platform 22, may be activated to move the stack from its position in bundling assembly 42 onto discharge platform 22.

Discharge platform 22 is an area where bundle 46 may be deposited, so that it can be picked up by grapple assembly 14. Alternatively, discharge platform may be designed to deposit bundle 46 directly onto the ground. In one embodiment, the discharge platform includes a conveyor belt 160 and rollers 161a and 161b to advance bundle 46 out of the bundling assembly 42 on an upper run of the belt. Grapple assembly 14 may then pick up bundle 46 and deposit it in storage area 24, onto another vehicle nearby or onto the ground.

Figure 13:
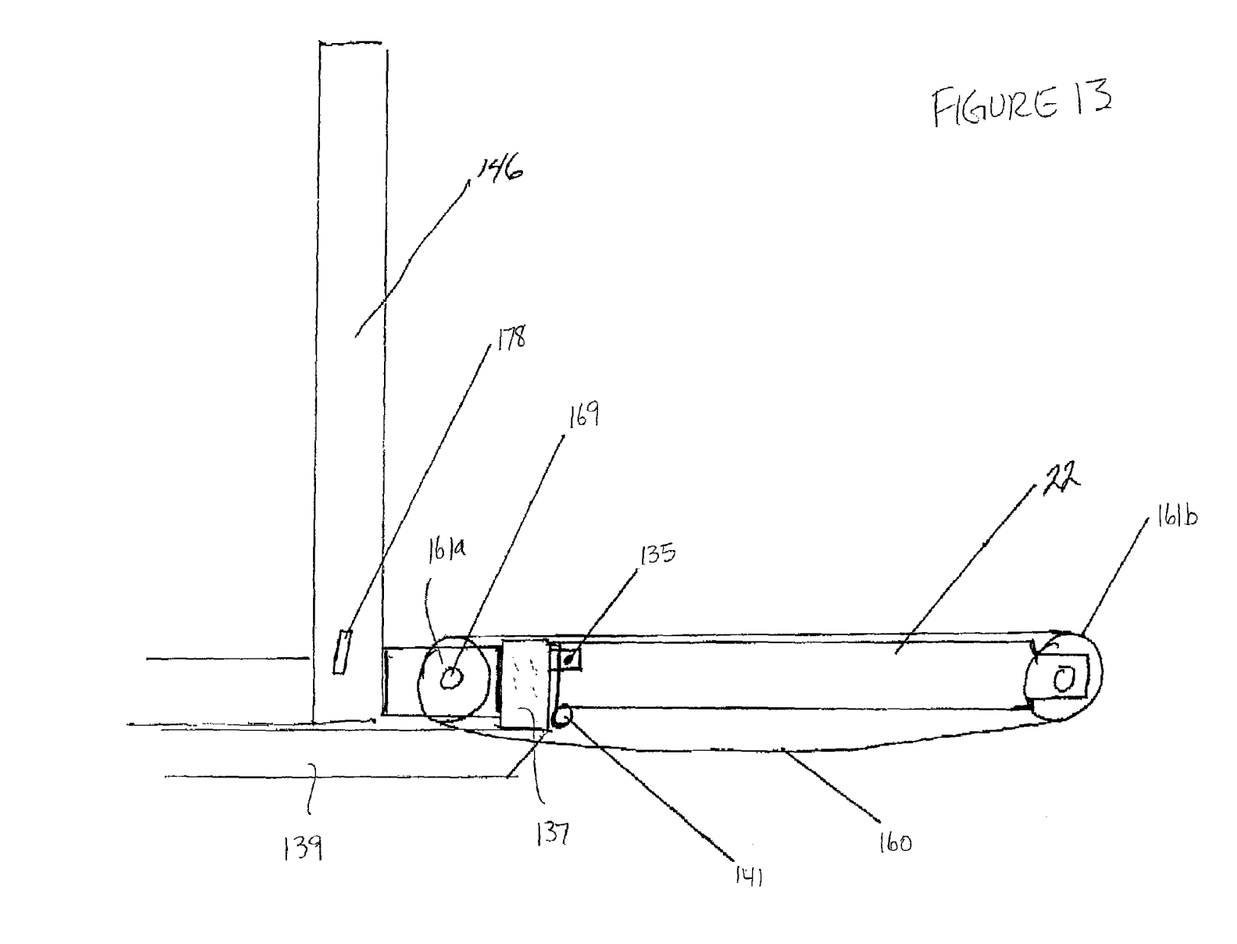
FIG. 13 is a side elevation view of the bundling assembly and discharge platform.

Discharge platform 22 may be fixed to trailer 16 with shear bolts 135 which may be attached to support frame 137 that rests on a bracing member 139, as shown in FIG. 13. The shear bolt is a safety mechanism to protect the stacking assembly from damage that might result from operator error when attempting to lift bundle 46 with grapple assembly 14. If, for example, the entire weight of the grapple is placed onto platform 22, shear bolts 135 will break and platform 22 will pivot at point 141, and swing downwards.

Storage area 24 may be sized to accommodate several bundles 46 of lumber, beside one another and/or stacked on top of one another. Bundles of lumber may be deposited in storage area 24 and transported to a second location, avoiding the need for a second vehicle, such as a Skidsteer, to follow the apparatus and pick up the bundles. In one embodiment the apparatus can carry 10 bundles of lumber. The bundles of lumber thus stored may be picked up by the grapple assembly 30 and moved to a secondary location, such as a storage yard or a second vehicle.

Figures 10A, 10B:
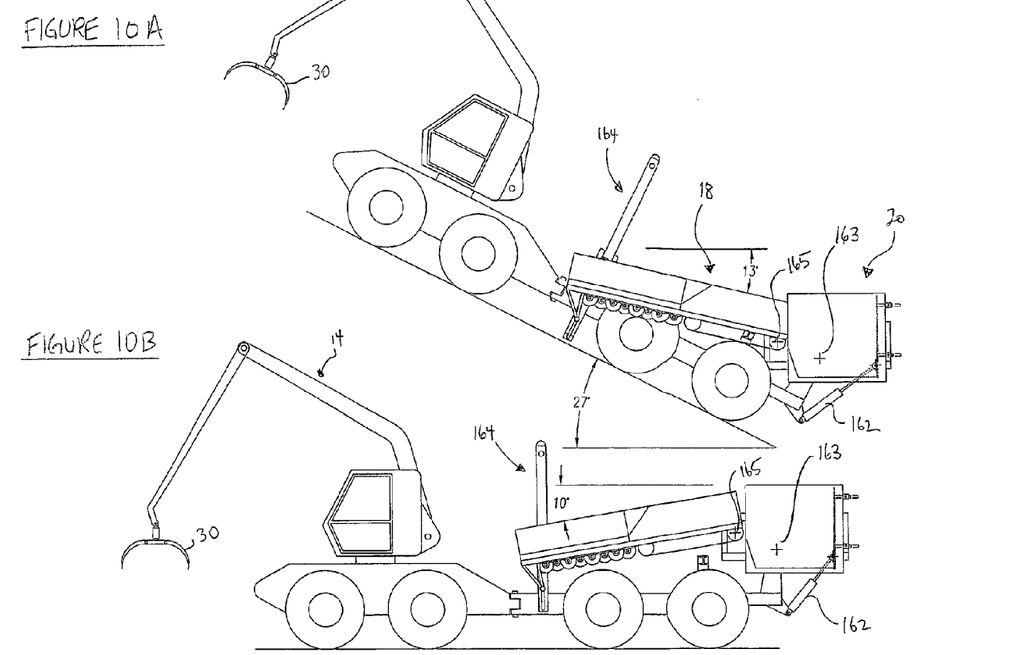
Figure 10C:
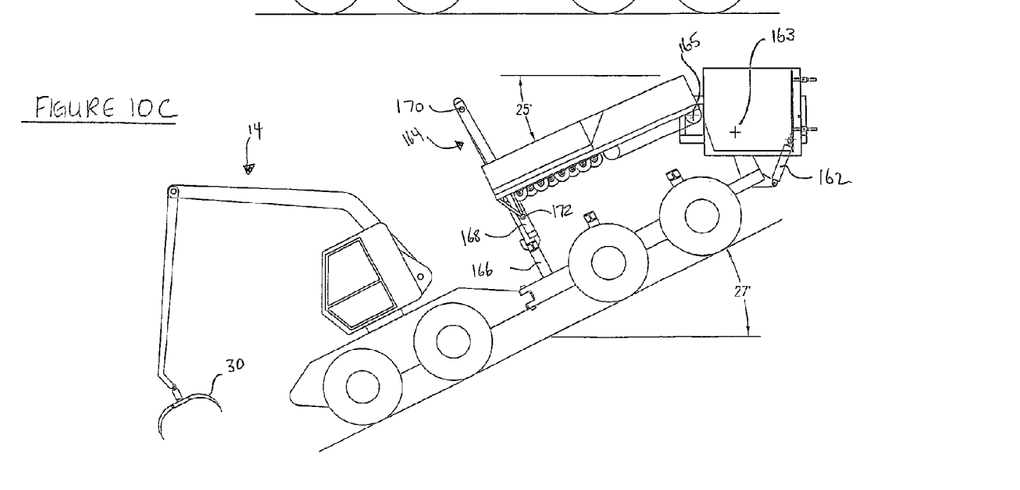

The apparatus of the present invention may be used on terrain that is not level, as indicated in FIG. 10A-C. Therefore, in some embodiments, also provided is a means of maintaining stacking assembly 20 level which may be coupled with a means of leveling conveyor assembly 18, in response to varying terrains, so that it will efficiently deposit lumber pieces into unscrambling hopper 36. This feature, in addition to the use of a grapple, provides even greater flexibility with regard to terrain, than the prior art device disclosed in Canadian patent application no. 2,315,046, or the use of a grapple alone. FIG. 10 demonstrates the relative movement of conveyor assembly 18 and stacking assembly 20, when an embodiment of the apparatus comprising both a means for leveling the conveyor assembly 18 and stacking assembly 20, is proceeding up a hill with an incline of 27 degrees (10A), on a level surface (10B), and down a hill with a decline of 27 degrees (10C). As noted, stacking assembly 20 remains relatively level in all situations. This may be accomplished by pivoting stacking assembly 20 about pivot point 163 by actuating hydraulic cylinders 162. As stacking assembly 20 pivots about 163, the end of conveyor assembly 18 may also pivot about pivot point 165.

Figure 11A:
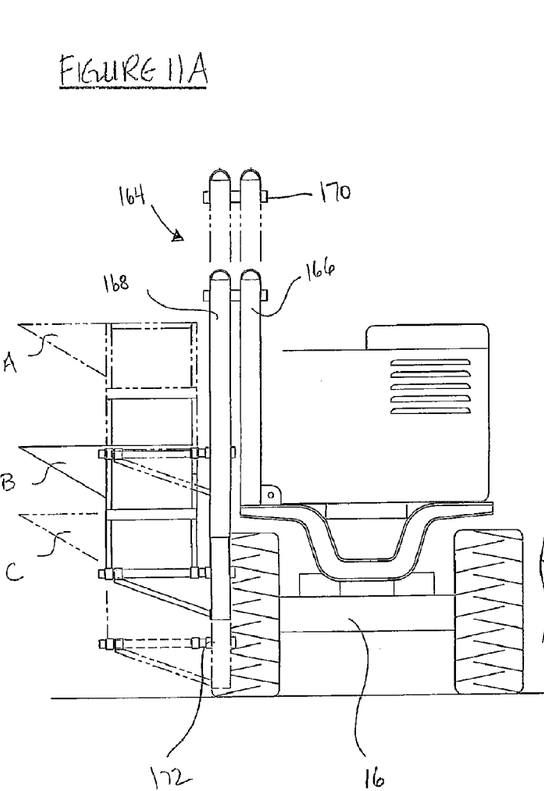
FIG. 11A is an end elevation view of an embodiment of the apparatus of the invention showing the position of the mast assembly and conveyor assembly relative to the trailer, when the apparatus is on an incline (C), level ground (B) or decline (A).
Figure 11B:
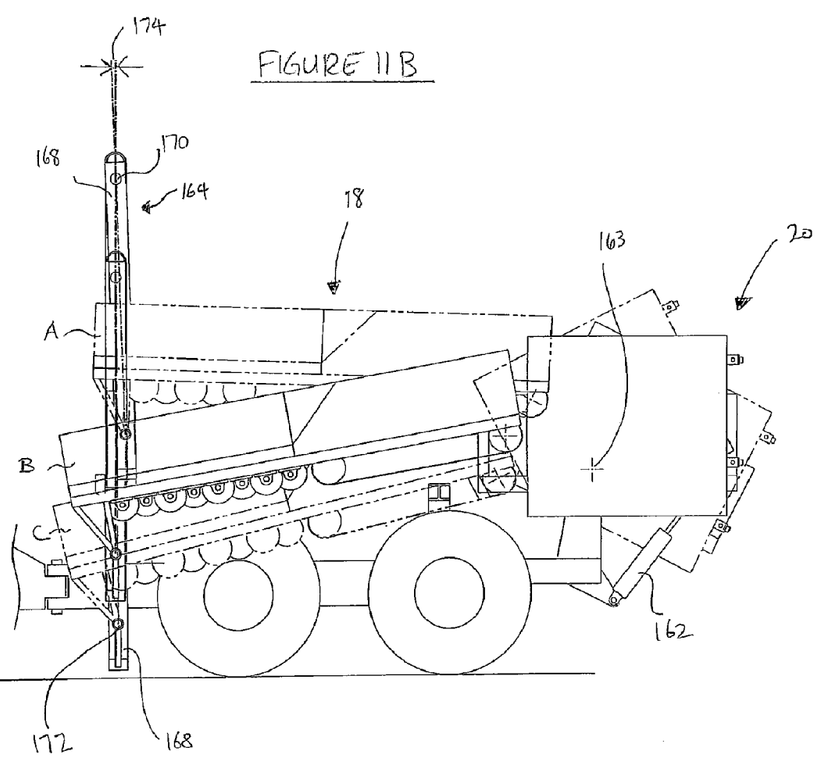
FIG. 11B is a side elevation view of an embodiment of the apparatus of the invention showing the position of the conveyor assembly relative to the stacking assembly, when the apparatus is on an incline (C), level ground (B) or decline (A).

The apparatus may also comprise a mast assembly 164, to raise and lower the conveyor assembly 18, to accommodate for the slope of the land on which the apparatus is being used. Therefore, conveyor assembly 18 may be moved up or down along mast assembly 164, which may comprise an inner mast 166 and an outer mast 168, each of which may comprise a hydraulic cylinder disposed therein to provide means of moving the mast vertically. FIGS. 11A and B shows the position of outer mast 168 and inner mast 166 at three different positions or heights, A, B and C, of conveyor assembly 18, corresponding to FIG. 10C, FIG. 10B and FIG. 10A, respectively.

Inner mast 166 may be mounted relatively perpendicular to the chassis of the trailer 16, as shown in FIG. 11A, and may be pivotally connected to outer mast 168 at pivot point 170. Conveyor assembly 18 may be attached to outer mast 168 at pivot point 172, and moves up and down with outer mast 168. Inner mast 166 telescopes upwardly to achieve position A in FIG. 10C. Outer mast 168 pivots about point 170 on inner mast 166, as conveyor assembly 18 moves up and down pivoting about point 172. The angular displacement of outer mast 168 relative to inner mast 166 can best be seen in FIG. 11B at arrows 174. As the mast assembly 164 is raised and lowered, the other end of conveyor assembly 18 may also pivot about pivot point 165.

Figure 12:
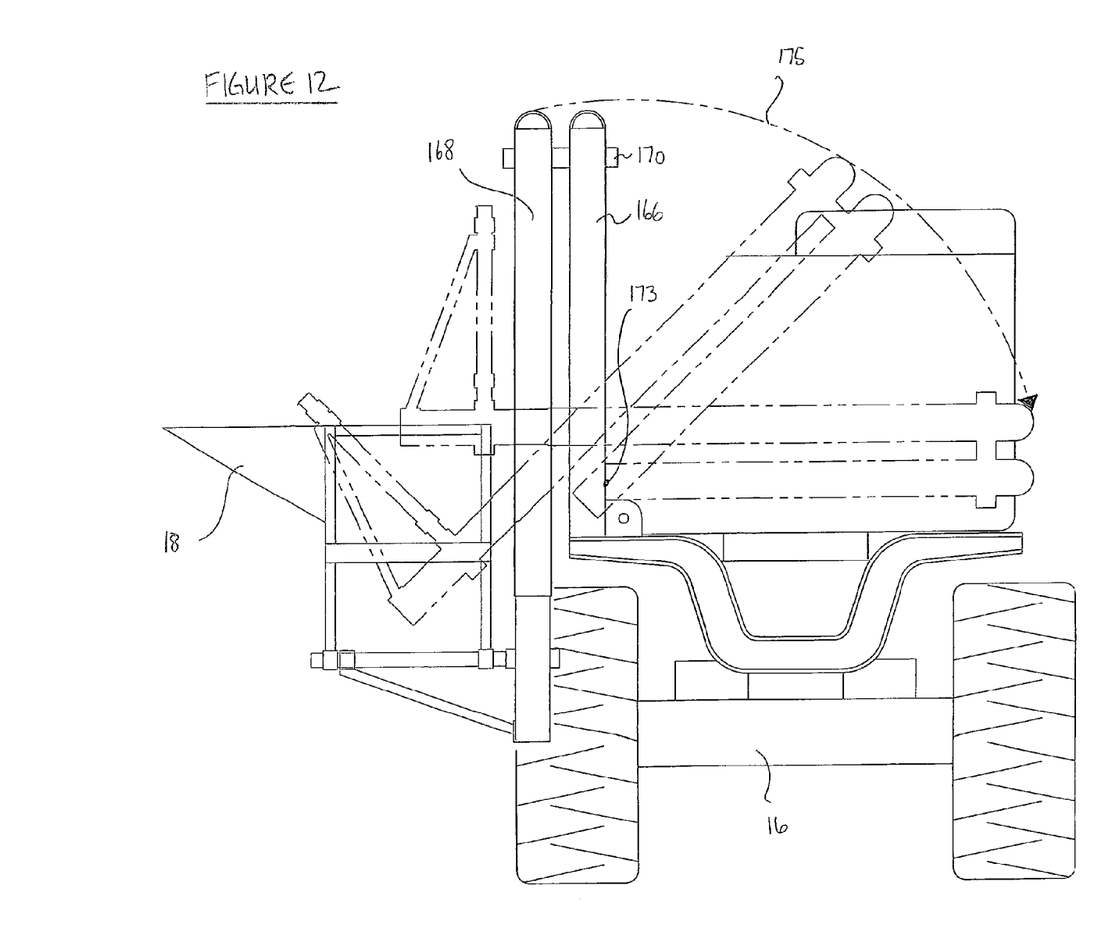
FIG. 12 is an end elevation view of an embodiment of the apparatus of the invention demonstrating how the mast assembly is positioned, after removal of the conveyor assembly, for transport.

In preparation for transport of the apparatus, conveyor assembly 18 may be removed from mast 168, and mast assembly 164 may be lowered into a prone position for transport, by pivoting about point 173, in the direction of arrow 175, as shown in FIG. 12. Additionally, unscrambling hopper 36 may be pivoted about shaft 94 by 180 degrees, to rest on top of row conveyor 38. At the other end of row conveyor 38, plate 127 of stacking bin 40 may be lowered onto stacking rollers 124, and discharge platform 22 may be pivoted upwards by about 90 degrees about the shaft 169 of roller 161a, and latched to bundling assembly 42 (see FIG. 13). The stacking bin 40, bundling assembly 42 and discharge platform may then be rotated 180 degrees about axis 176 (see FIG. 9E), to rest on top of the unscrambling hopper 38. The stacking bin and attached bundling assembly/discharge platform may be lifted and flipped over by using grapple assembly 14 to grasp a sling that may be connected to a lifting lug 178, shown in FIG. 13. A similar lug/sling assembly may be used to lift and flip over unscrambling hopper 36. In this manner, the width of the apparatus may be reduced to facilitate transport.

The driver of drive means 10, therefore, preferably controls the picking up and feeding of lumber pieces 44 into conveyor assembly 18, the conveyor assembly 18, and the removal of bundle 46 from discharge platform 22. The rear operator standing near the stacking assembly 20 preferably controls the stacking action by controlling the feeding of the row of lumber pieces, ensuring that the pieces are properly oriented and carried onto the bundle elevator, and controlling the feeding of the bundling through the bundling assembly and bundling thereof.

Having thus described apparatus 1 of the present invention, a method of picking up and bundling lumber pieces 44, will now be described. A driver, who preferably also controls the drive means 10 of the apparatus, operates grapple assembly 14, to pick up one or more pieces of lumber 44 from the ground. The lumber piece or pieces are deposited into receiving bin 32 by positioning grapple 30 above the receiving bin, and opening grapple arms 48 to drop the lumber pieces into the bin. Rollers 56 turn, to move the lumber pieces towards conveyor 34, which transports the lumber pieces into unscrambling hopper 36. In unscrambling hopper 36 the elevating chain assembly sequentially lifts the lumber pieces 44 up and deposits them one at a time onto row conveyor 38. On row conveyor 38 the lumber pieces 44 are assembled into rows, and the rows are assembled one on top of another into a stack of lumber, in stacking bin 40. The stack may then be moved into bundling assembly 42, where it is bundled into a bundle 46, and deposited onto discharge platform 22. A rear operator, preferably standing near the stacking assembly ensures that the stacking and bundling process proceeds smoothly.

Bundle 46 may then be picked up by grapple assembly 14 and deposited in storage area 24, onto a waiting vehicle, or onto the ground. Alternatively, the discharge platform 22 may deposit the bundle directly onto the ground.

While the apparatus has been described in conjunction with the disclosed embodiments, it will be understood that the apparatus is not intended to be limited to these embodiments. On the contrary, the apparatus is intended to cover alternatives, modifications and equivalents, which may be included within the spirit and scope of the invention as defined by the appended claims. Various modifications will remain readily apparent to those skilled in the art.

What is claimed is:

1. An apparatus for picking up, stacking and bundling lumber, comprising:
   (a) a chassis,
   (b) a grapple carried with the chassis,
   (c) a conveyor assembly supported on the chassis,
   (d) a stacking assembly operatively connected adjacent the conveyor assembly, the stacking assembly including an unscrambling hopper, a row conveyor, a stacking bin and a bundling assembly, and,
   (e) a discharge platform operatively connected adjacent the bundling assembly,
   wherein the conveyor assembly includes a frame, a pivotal connection for the frame to permit angular adjustment of the frame relative to the chassis, an extendible mast connected between the frame and the chassis to drive the frame about the pivotal connection and a receiving bin and a conveyor carried on the frame, the conveyor positioned between the receiving bin and the stacking assembly and being operable to move lumber from the receiving bin to the stacking assembly and the mast being operable to drive adjustment of the angle of the frame relative to the chassis to select the approach angle for the conveyor relative to the stacking assembly.

2. The apparatus of claim 1 wherein the mast drives the frame adjacent the receiving bin to select a spacing between the frame and the chassis.

3. The apparatus of claim 1 wherein the pivotal connection connects between the frame and the stacking assembly.

4. The apparatus of claim 1 wherein the stacking assembly further includes a pivoting arrangement for tilting the stacking assembly relative to the chassis to provide for substantial leveling of the stacking assembly when operating on uneven ground surfaces.

5. The apparatus of claim 1 further comprising a pivot point on the mast through which the mast can be pivoted down over the frame to an inactive position for transport.

6. The apparatus of claim 1 wherein the mast includes a hydraulic cylinder drivable to telescope to various lengths.

7. The apparatus of claim 1 wherein the mast includes an inner mast and an outer mast, the inner mast being mounted to the chassis to extend substantially perpendicularly upwardly therefrom, the outer mast being pivotally connected to the inner mast and being pivotally connected to the frame, at least one of the inner mast and the outer mast having an adjustable length to move the frame to a selected height relative to the chassis to select the spacing therebetween.

8. An apparatus for picking up, stacking and bundling lumber, comprising:
   (a) a chassis,
   (b) a grapple carried with the chassis,
   (c) a conveyor assembly supported on the chassis,
   (d) a stacking assembly operatively connected adjacent the conveyor assembly, the stacking assembly including an unscrambling hopper, a row conveyor, a stacking bin and a bundling assembly, and,
   (d) a discharge platform operatively connected adjacent the bundling assembly, wherein the unscrambling hopper includes a front wall adjacent the conveyor assembly, a back wall opposite the front wall, a first side wall extending between the front wall and the back wall along which a lumber elevating assembly operates, a second side wall extending between the front wall and the back wall and spaced from the first side wall, a bottom, an adjustable front panel positioned adjacent the front wall in an open space defined between the front wall and the back wall and moveable towards and away from the front wall to adjust the length of the open space and an adjustable back panel positioned adjacent the back wall in the open space and moveable towards and away from the back wall to adjust the length of the open space.

9. The apparatus of claim 8 wherein the adjustable back panel is moveable to tilt from side to side and from top to bottom.

10. The apparatus of claim 9 wherein the adjustable back panel is positionable to be closer at its bottom edge to the back wall than at its upper edge and closer to the back wall at a first side edge adjacent the first side wall than at its opposite side edge.

11. The apparatus of claim 8 wherein the unscrambling hopper further includes a latching mechanism through which the bottom is openable for cleaning debris from the unscrambling hopper.

12. The apparatus of claim 8 wherein the bottom includes a plurality of rollers driveable to rotate in a direction toward the back wall.

13. The apparatus of claim 8 further comprising openings between the rollers.

\* \* \* \* \*